United States Patent [19]

Monroe et al.

[11] Patent Number: 5,268,963
[45] Date of Patent: Dec. 7, 1993

[54] SYSTEM FOR ENCODING PERSONALIZED IDENTIFICATION FOR STORAGE ON MEMORY STORAGE DEVICES

[75] Inventors: Midori J. Monroe, Vancouver, Canada; George Y. Huang, Chicago; Tony D. Martin, Arlington Heights, both of Ill.

[73] Assignee: Audio Digital Imaging Inc., Arlington Heights, Ill.

[21] Appl. No.: 895,642

[22] Filed: Jun. 9, 1992

[51] Int. Cl.⁵ .............................. H04K 1/00
[52] U.S. Cl. ........................ 380/23; 380/25; 380/49
[58] Field of Search ................. 380/23-25, 380/49, 50; 340/825.31, 825.34; 235/380, 382, 382.5, 472, 493

[56] References Cited

U.S. PATENT DOCUMENTS

| | | |
|---|---|---|
| 4,580,134 | 4/1986 | Campbell et al. |
| 4,650,981 | 3/1987 | Foletta |
| 4,689,477 | 8/1987 | Goldman ............... 380/23 |
| 4,745,268 | 5/1988 | Drexler |
| 4,879,747 | 11/1989 | Leighton et al. |
| 4,888,798 | 12/1989 | Earnest ................. 380/25 |
| 4,893,815 | 1/1990 | Rowan ................... 380/23 |
| 4,961,229 | 10/1990 | Takahashi |
| 4,972,476 | 11/1990 | Nathans ................. 380/23 |
| 4,979,159 | 12/1990 | Tsuruoka et al. |
| 4,993,068 | 2/1991 | Piosenka et al. |
| 4,995,081 | 2/1991 | Leighton et al. |
| 5,018,017 | 5/1991 | Sasaki et al. |
| 5,027,401 | 6/1991 | Soltesz |
| 5,053,608 | 10/1991 | Senanayake |
| 5,057,924 | 10/1991 | Yamada et al. |
| 5,067,029 | 11/1991 | Takahashi |
| 5,068,744 | 11/1991 | Ito |
| 5,168,371 | 12/1992 | Takayanagi ........... 380/23 |

*Primary Examiner*—Salvatore Cangialosi
*Attorney, Agent, or Firm*—Wood, Phillips, VanSanten, Hoffman & Ertel

[57] ABSTRACT

A fake-proof card encoding system comprises an encoding read/write device utilizing components that allow for the recording of data to an EEPROM memory device. A photographic-type image is acquired, digitized and compressed for storage in the memory. The data comprises a data table containing randomly distributed unique serialized information. This information may be the serial number of the encoding read/write terminal, or the issue number of the particular identification information created by the encoding terminal. Advantageously, the system uses color cell compression for the acquisition, digitization and compression of the photographic-type image, which may be a facial representation, fingerprint, signature, voice print, eye retina or any other unique personal identification in a compressed form which may later be machine read to verify the positive identification of the presenter.

15 Claims, 7 Drawing Sheets

FIG. 9

VIDEO IMAGE DATA

| AND | OFFSET TABLE BYTES | DATA DISBURSEMENT AREA |
|---|---|---|
| H | 2 4 6 9 6 8 1 A 3 C F 2 4 9 A 0 F | C C B 3 4 9 7 8 C C 2 3 9 4 2 6 7 |
| L | 1 8 5 2 1 2 4 8 C 3 7 F 7 0 6 6 | 3 9 4 5 6 7 F 2 1 1 0 3 4 5 6 7 F C |
| # | 0 1 2 3 4 5 6 7 8 9 10 11 12 13 14 15 16 | 17 18 19 20 21 22 23 24 25 26 27 28 29 30 31 32 33 |

READ DATA TABLE

| AND | OFFSET TABLE BYTES | DATA DISBURSEMENT AREA |
|---|---|---|
| H | 2 4 6 9 6 8 1 A 3 C F 2 4 9 A 0 F | C C C B 3 C 4 C 9 7 8 C C C 2 3 9 |
| L | 1 8 5 2 1 2 4 8 C 3 7 F 7 0 6 6 | 3 1 9 4 5 6 2 7 3 8 2 2 1 4 0 3 4 5 |
| # | 0 1 2 3 4 5 6 7 8 9 10 11 12 13 14 15 16 | 17 18 19 20 21 22 23 24 25 26 27 28 29 30 31 32 33 |
|   |   | * *    *    * |

— 100

SYSTEM FOR ENCODING PERSONALIZED IDENTIFICATION FOR STORAGE ON MEMORY STORAGE DEVICES

FIELD OF THE INVENTION

This invention relates to customer cards and, more particularly, to an encoding system for encoding fake-proof video information data for storage on a memory storage device on such a customer card.

FIELD OF THE INVENTION

Various forms of customer cards are in common use. In many instances it is readily possible to create a fake or fraudulent card which can be used to the detriment of the card issuer or an establishment accepting a card. For example, one common form of an identification card is a state issued drivers license. This card usually includes a photograph of the card holder. The photograph on a drivers license can be altered. Alternatively a fraudulent card can be made. Credit or debit cards are often used for purchases. Such cards include embossment of the card holder's name and card number. Often, these cards also includes a magnetic stripe to provide a higher level of security. However, these cards can also be easy to counterfeit. To verify transactions using such cards, it is often necessary to compare the card number to a list of fraudulent or stolen cards or by telephoning a credit card verification service.

In order to minimize fraud, certain card identification systems have been used in which a memory in some form on the card stores data representing a user's credentials, such as a photograph or fingerprint. Such systems are disclosed, for example, in Piosenka et al., U.S. Pat. No. 4,993,068 and Soltesz, U.S. Pat. No. 5,027,401. Both patents disclose a system in which a photographic representation is stored in the memory means for later retrieval at a remote site. However, it is not apparent that such systems would provide adequate protection from counterfeiting.

The present invention is directed to solving one or more of the above problems.

SUMMARY OF THE INVENTION

In accordance with the invention there is disclosed an encoding system for generating a personal card which offers a high level of cost effective fraud protection.

Broadly, there is disclosed herein a method of encoding fake-proof video information data for storage on a user identification card including memory means for storing such data for later retrieval. The method comprises the steps of acquiring personal video information for a user of an identification card; digitizing the acquired video information for storage in the card's memory means, the digitized video information comprising an information data table; generating unique digitized system verification information, the digitized verification information comprising a verification data table; combining the information data table with the verification data table, including inserting elements of data from the verification data table at select distributed locations in the information data table; and recording the combined information data table and verification table into a memory means of a user identification card.

It is a feature of the invention that the digitizing step further comprises the step of performing compression of the digitized video information stored in the information data table.

In accordance with one aspect of the invention, the information data table comprises a table of N bytes of data and the comparing step includes the steps of creating an offset table using the first M bytes of data, where M is less than N, the offset table defining an offset value for each of a plurality of index numbers, selecting index values using information table data, and sequentially inserting bytes of data from the verification data table into the information data table at positions related to the offset values associated with the selected index values.

It is another feature of the invention that the generating step comprises generating digitized system verification information identifying a unique serial number assigned to a terminal used to implement the method.

It is yet another feature of the invention that the generating step comprises generating digitized system verification information identifying an issue serial number assigned to the user identification card.

There is disclosed in accordance with another aspect of the invention a fake-proof system for recording video verification information in a user identification card, the card including memory means for storing verification information stored thereon for later retrieval. The system includes means for acquiring personal video identification information for a user of an identification card. Means are provided for electronically digitizing acquired video information for storage in the card's memory means, the digitized video information comprising an information data table. Means are provided for generating unique digitized system verification information, the digitized verification information comprising a verification data table. Means are provided for combining the information data table with the verification data table, including means for inserting elements of data from the verification data table at select distributed locations in the information data table. Means are operatively associated with the combining means for recording the combined information data table and verification data table into a memory means for a user identification card.

More specifically, the system comprises an encoding read/write device utilizing components that allow for the recording of data to an EEPROM memory device. A photographic-type image is acquired, digitized and compressed for storage in the memory. The data comprises a data table containing randomly distributed unique serialized information. This information may be the serial number of the encoding read/write terminal, or the issue number of the particular identification information created by the encoding terminal.

Advantageously, the system uses color cell compression for the acquisition, digitization and compression of the photographic-type image, which may be a facial representation, fingerprint, signature, voice print, eye retina or any other unique personal identification in a compressed form which may later be machine read to verify the positive identification of the presenter.

Further features and advantages of the invention will readily be apparent from the specification and from the drawing.

BRIEF DESCRIPTION OF THE DRAWING

FIG. 9 illustrates an exemplary video image data table;

FIG. 10 illustrates the video image data table further including encrypted verification data.

DETAILED DESCRIPTION OF THE INVENTION

In accordance with the invention, a method and system are disclosed for acquiring, digitizing and compressing a photographic-type image on a memory device, the data containing randomly distributed unique serialized information which can be used for verifying authenticity of the card.

Figure 1:
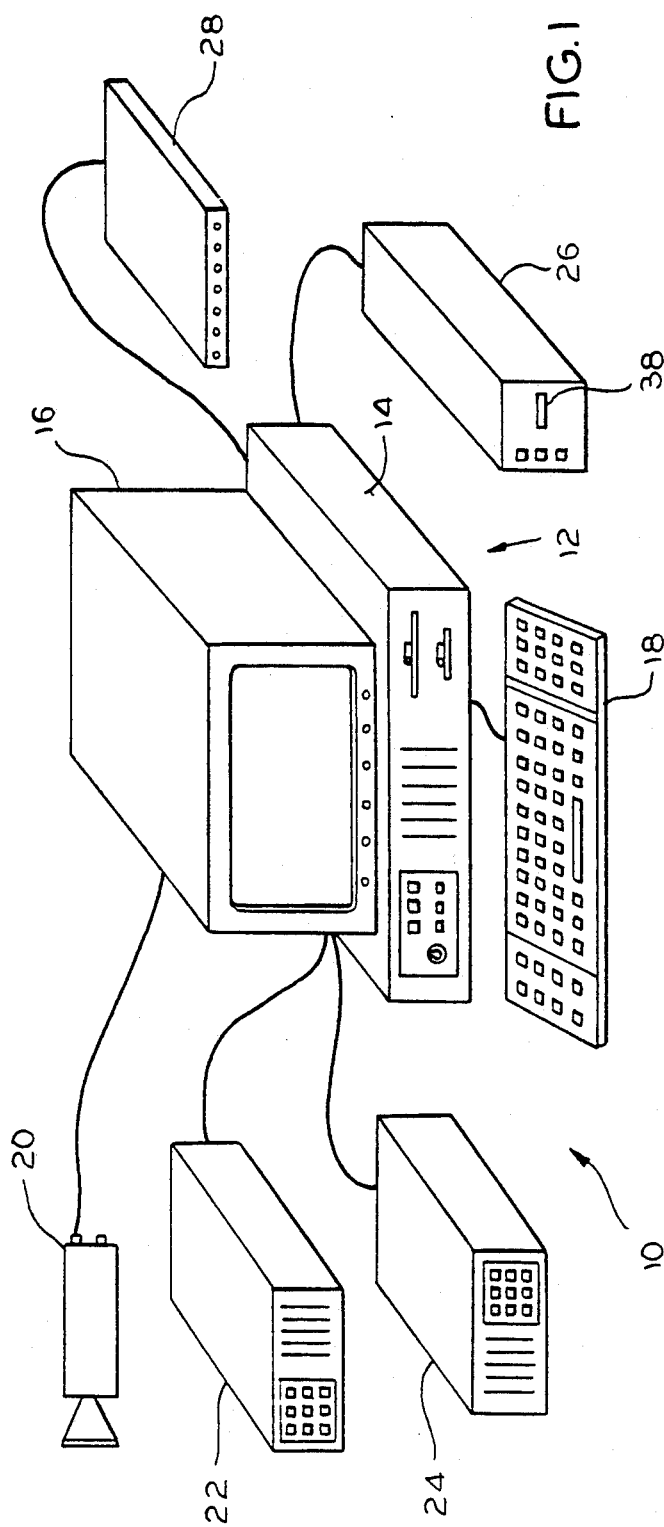
FIG. 1 is a perspective view of a terminal used for the fake-proof system according to the invention.

With reference to FIG. 1, a terminal 10 used for performing the encoding is illustrated. The terminal 10 comprises a personal computer system 12 and associated peripheral components. Particularly, the personal computer system 12 includes a computer 14, monitor 16 and keyboard 18, all of conventional construction. The peripheral components comprises a TV camera 20, an optical scanner 22, an optical biometrics device 24, a memory card reader/writer 26 and a modem 28.

The TV camera 20 can be used, for example, to take a photographic image of an individual which is digitized and used by the computer system 12. The optical scanner 22 may be used, for example, for reading photographic personal information, such as a facial photograph. The optical biometrics device 24 may be used for reading biological representations for a user, such as a fingerprint or voiceprint. These peripheral devises may take any known form which are capable of interfacing with a conventional personal computer system 12 and are used merely as input devices for providing suitable data to the personal computer system 12.

Figure 2:
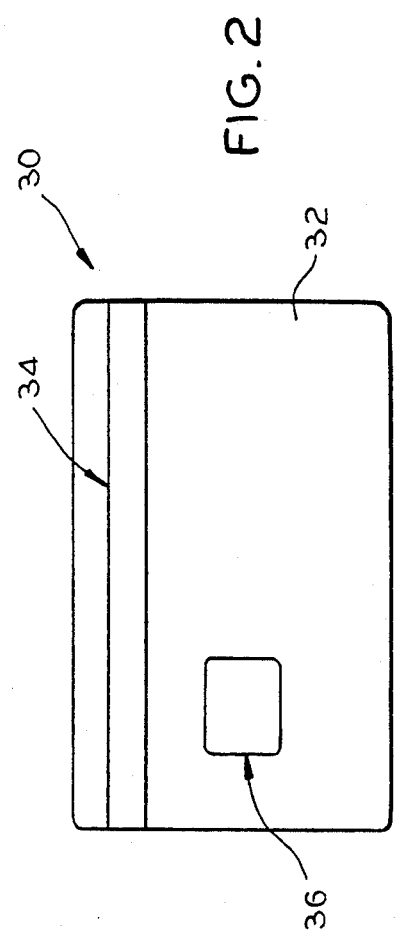
FIG. 2 is an elevation view of a customer card including a memory storage device used with the terminal of FIG. 1.

The memory card reader/writer 26 is used for reading or writing data from the personal computer system 12 to a user identification card 30, see FIG. 2. The user identification card 30 comprises an integrated circuit card, often referred to as a "smart card." The card comprises a plate 32 including a magnetic stripe 34 for magnetically storing data and an integrated circuit 36. The integrated circuit 36 comprises an EEPROM memory chip with a microprocessor.

The memory card 30 may take any known form. An example of a typical such card is illustrated and described in Foletta, U.S. Pat. No. 4,650,918. The particular type of card is not itself part of the invention other than serving as a memory storage device for storing fake-proof video information data for later retrieval. Particularly, the card 30 is inserted in a slot 38 of the memory card reader/writer 26, see FIG. 1. Data is read from or written to the circuit 36 as controlled by the computer system 12.

Figure 3:
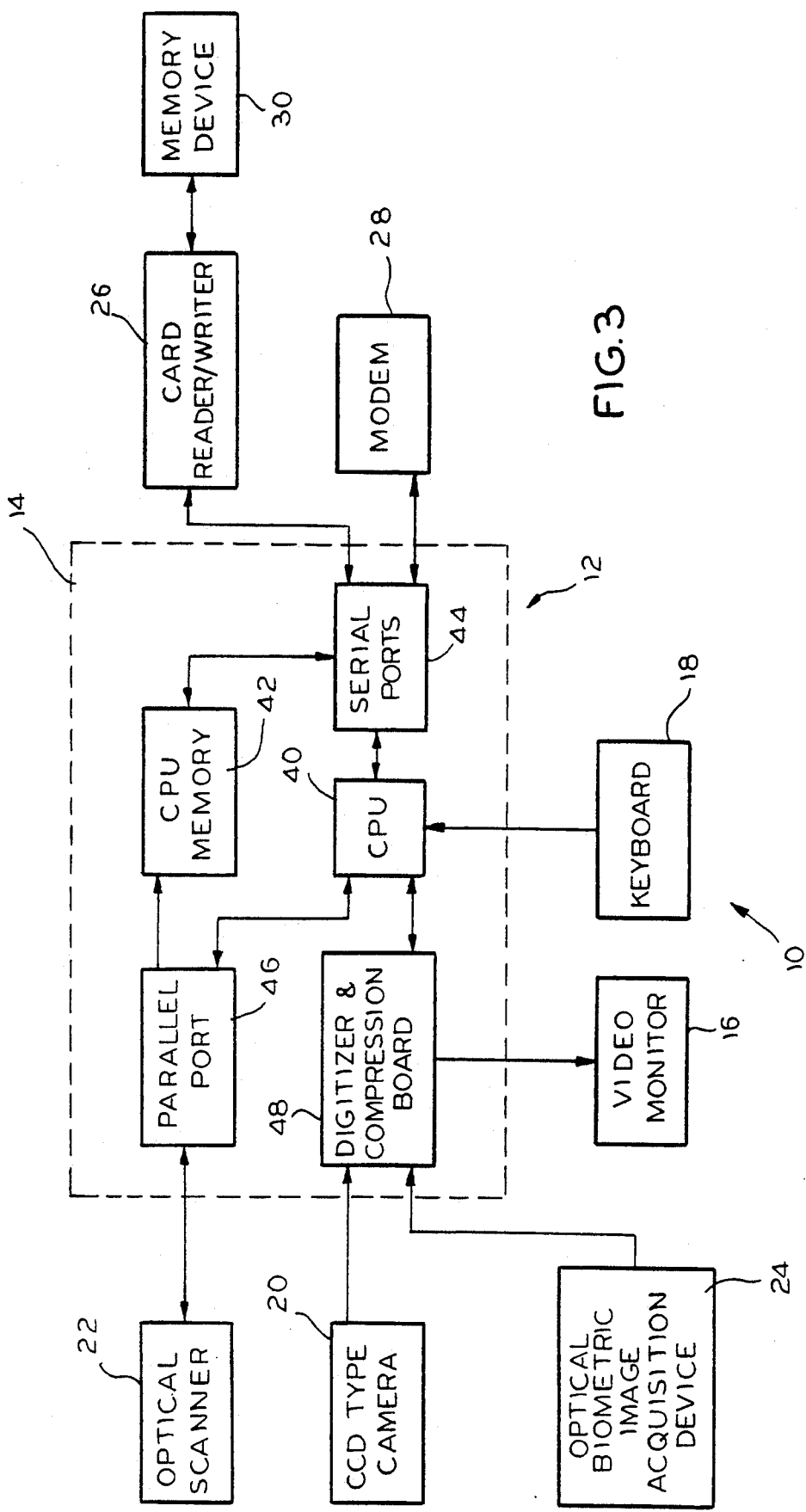
FIG. 3 is a block diagram illustrating the components for the terminal of FIG. 1.

With reference to FIG. 3, a block diagram illustrates the terminal 10 with the computer system 12 shown in greater detail.

The modem 28 may be any conventional commercially available for PC communications. The modem 28 may be used, for example, to send verification information for a particular card 30 to a central host system for later retrieval and authorization.

The personal computer system 12 may be any commercially available personal type computer system. The block diagram illustrates typical components in such a computer connected in a conventional manner. Particularly, a central processing unit (CPU) 40 is connected to CPU memory 42. The CPU memory 42 may include a plurality of memory devices, such as RAM memory, ROM memory and external memory storage devices. The CPU 40 is also connected to serial ports 44 and a parallel port 46. The ports 44 and 46 are also connected to the CPU memory 42 for direct memory access. The keyboard 18 is directly connected to the CPU 40 for command and text input. The parallel port 46 is connected to the optical scanner 22 as an input for personal information provided in photographic form. The serial ports 44 connect the modem 28 and memory card reader/writer 26 to the CPU 40. The camera 20, which may be a CCD type camera, and the optical biometrics image acquisition device 24 are connected to the CPU 40 through a digitizer and compression board 4B. The video monitor 16 is also connected to the CPU 40 through the board 48.

The digitizer and compression board 48 is used for acquiring image data from the camera 20 or biometrics device 24 and digitizing and compressing the photographic image data for transfer to the CPU 40. The optical scanner 22 includes its own circuits and software for providing digitization and compression.

The digitizer and compression board 48 may comprise a high resolution color video image acquisition and compression system, such as described in Frederiksen, U.S. Pat. No. 4,743,959, the specification of which is hereby incorporated by reference herein. As described therein, the system uses an encoding method in which a color image represented by its luminance and chrominance components is sectored into a plurality of blocks which are separately encoded. The resulting coded data is stored in the form of a compressed file which includes the actual coded information along with a specially formatted rigid, sparse, virtual and partial (RSVP) color table. The encoding procedure involves the compression of representative data extracted from the color image by processing it on the basis of a predefined data compression sequence. The encoded data can be separated so that a predesignated portion of the data represents the information needed to reproduce a mosaic which possesses sufficient clarity to allow the user to preview the actual image.

In accordance with the invention, the encoded image is encrypted with randomly distributed unique serialized information which may be unique to the terminal 10 or an issue number of the particular card 30, as discussed below.

The terminal 10 also provides for the additional recording of text data information in designated fields.

The CPU 40 is operated by a control program which controls the sequence of operation. This program may include conventional disk operating systems and other main or executive programs for controlling overall operation. These and other application programs are not described in any detail herein, as they do not relate to the inventive features of the system. With reference to FIGS. 4-8, a series of flow diagrams illustrate operation of control programs for encoding fake-proof photographic image for storage on the integrated circuit 36 of the memory card 30, see FIG. 2.

Figure 5:
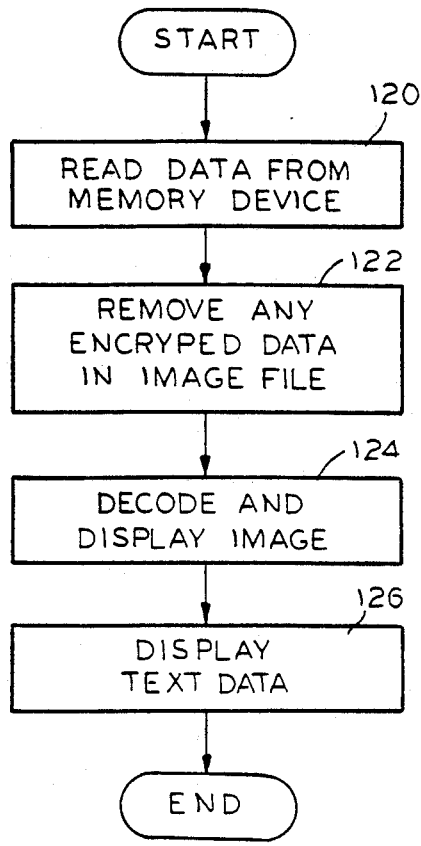
FIG. 5 is a flow chart illustrating a program for a display process of FIG. 4.
Figure 6:
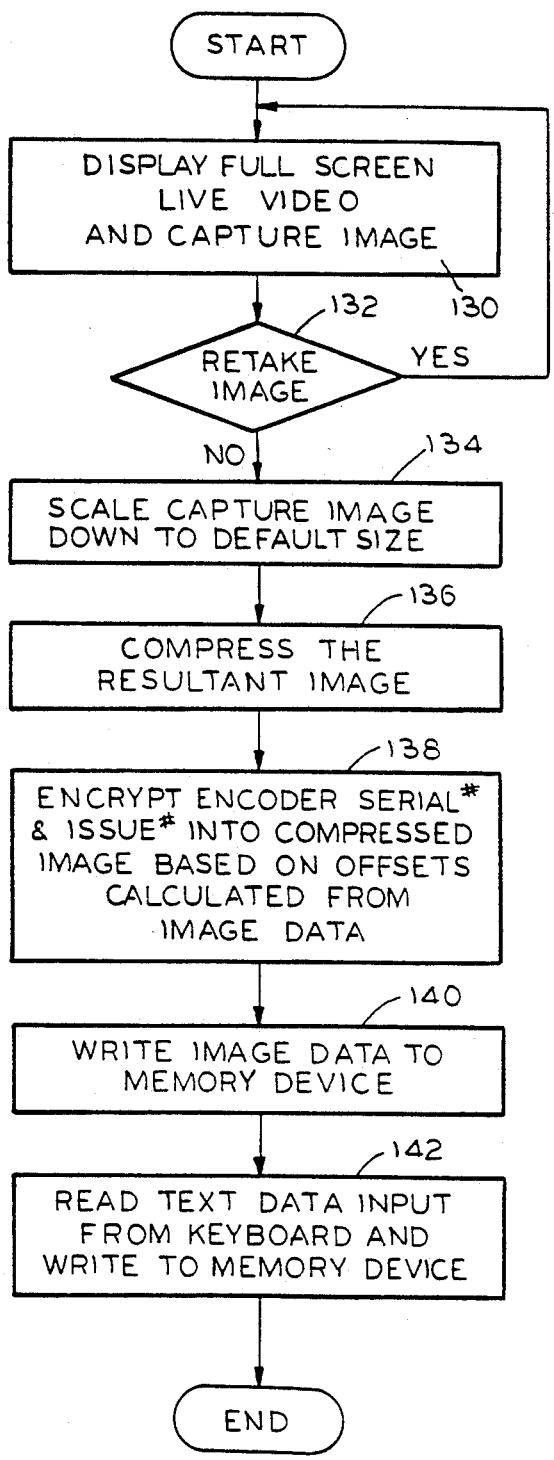
FIG. 6 is a flow chart illustrating a create process of FIG. 4.
Figure 7:
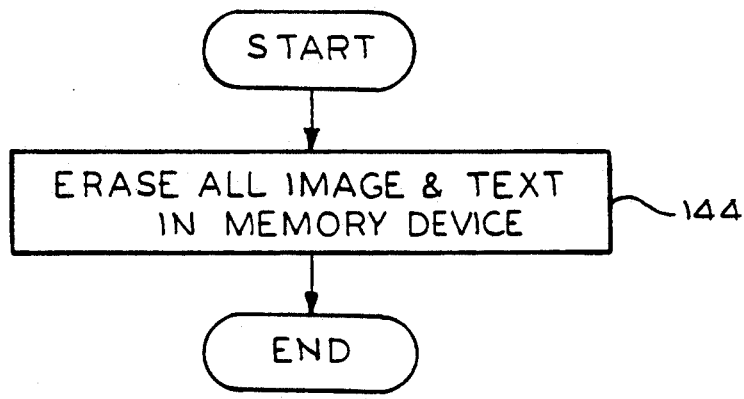
FIG. 7 is a flow chart for a clear process of FIG. 4.
Figure 8:
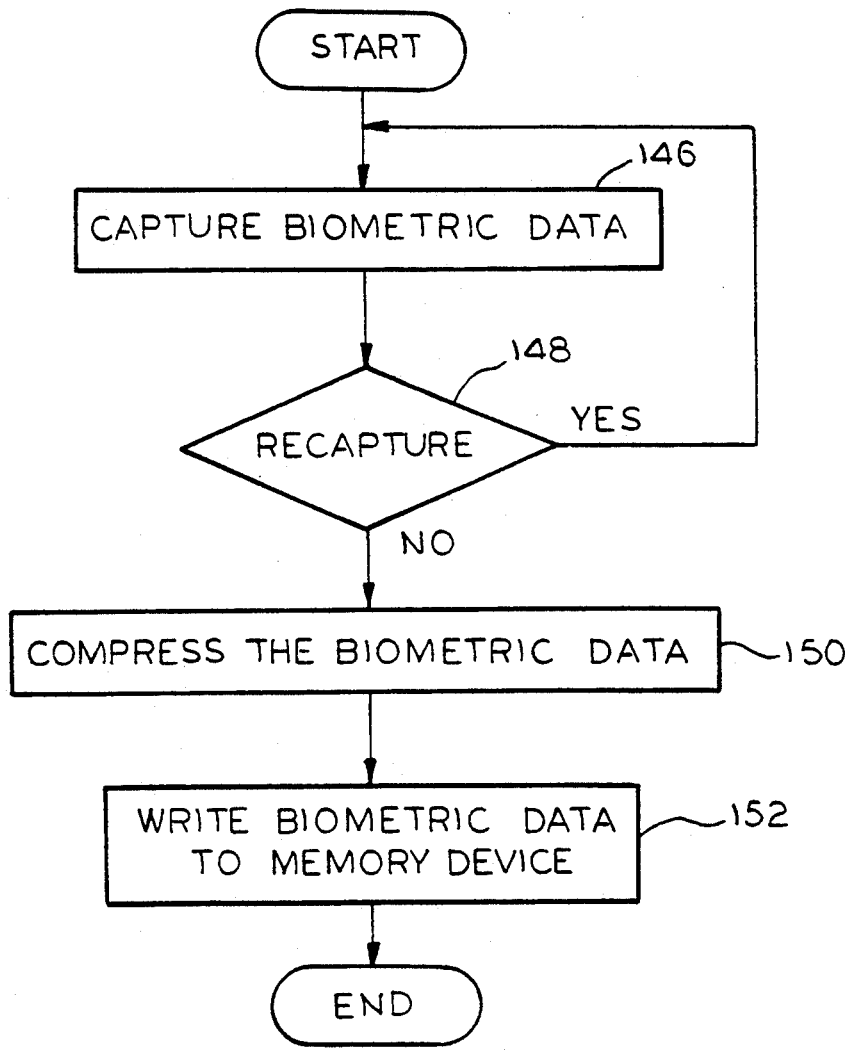
FIG. 8 is a flow chart of a program for an optical biometrics process of FIG. 4.

Upon starting the encode system program, a block 100 initializes the system and displays valid keyboard function requests. In the illustrated embodiment, there are four valid keyboard function requests, namely DISPLAY, CREATE, CLEAR, or OPTICAL BIOMETRICS. A block 102 continuously reads the keyboard to recognize the receipt of a valid function request. A block 104 determines if a request is a DISPLAY request. If so, then a DISPLAY process, illustrated in FIG. 5, is implemented at a block 106. If not, then a decision block 108 determines if the request is a CREATE request. If so, then the CREATE process illustrated in FIG. 6 is implemented at a block 110. If not, then a decision block 112 determines if the request if a CLEAR request. If so, then a CLEAR process, illustrated in FIG. 7, is implemented at a block 114. If not, then a decision block 116 determines if the request is for OPTICAL BIOMETRICS. If so, then an OPTICAL BIOMETRICS process, illustrated in FIG. 8, is implemented at a block 118. If not, then control returns to the block 102.

Figure 4:
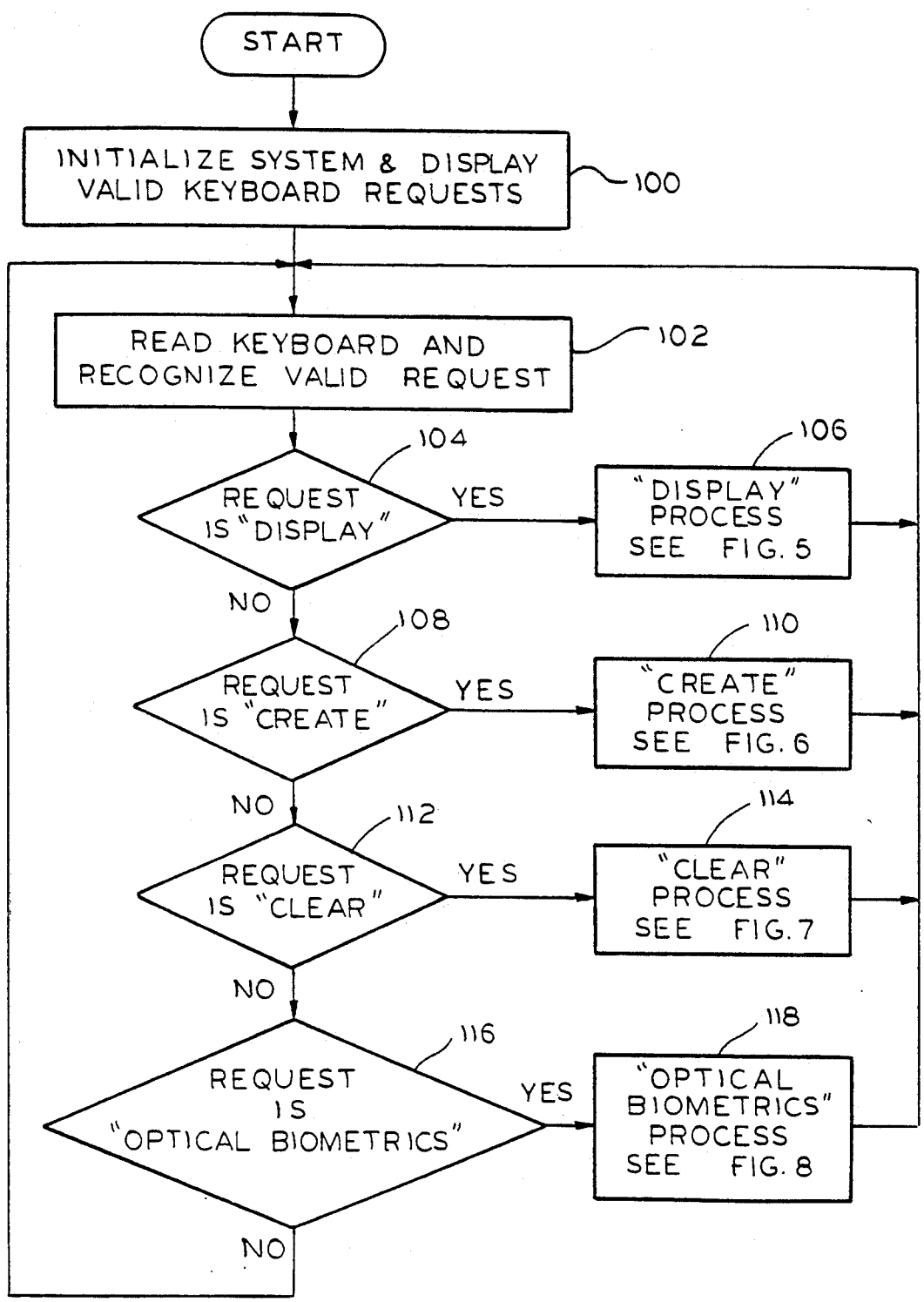
FIG. 4 is a flow chart for a main program implemented by the CPU of FIG. 3.

With reference to FIG. 5, a flow chart illustrates operation of the DISPLAY process of block 106, see FIG. 4. This process begins at a block 120 which reads data from the memory device. Particularly, this process is used for displaying a video image stored on a memory card 30 placed in the reader 26. At the block 120, a data table from the memory card 30 is read. At a block 122, any encrypted data from the image file is removed and the image file is decoded and then displayed on the monitor 16 at a block 124. The decoding is done by the digitizer and compressor board 48, discussed above. Finally, text data is displayed at a block 126 and the process ends.

With reference to FIG. 6, a flow chart illustrates the program for the CREATE process of block 110, see FIG. 4. The CREATE process begins at a block 130, which displays a full-screen live video capture image. This image is received from either the camera 20 or optical scanner 22. A decision block 132 determines if it is necessary to retake the image. If so, then control returns to the block 130. If not, then control advances to a block 134 which scales the capture image down to a default size and the resultant image is compressed at a block 136. These functions are performed by the digitizer and compressor board 46 under the control of the CPU 40, as described in the Frederiksen patent incorporated by reference herein. At a block 138, the compressed image is encrypted with an encoder serial number and issue number based on offsets calculated from image data. This procedure is discussed in greater detail below. The encrypted image data is then written to the memory card 30 via the reader/writer 26 at a block 140. Finally, text data input form the keyboard 18 is written to the memory card 30 at a block 142 and the routine ends.

With reference to FIG. 7, the CLEAR process of block 14, see FIG. 4, is illustrated. The CLEAR process includes a single block 144 which erases all image and text currently stored on a memory card 30.

With reference to FIG. 8, a flow chart illustrates a program for the optical biometrics process of block 118, see FIG. 4. This process begins at a block 146 which captures biometrics data read from the optical biometrics image acquisition device 24. A decision block 148 determines if it is necessary to recapture the data. If so, then control returns to the block 146. If not, then the biometrics data is compressed at a block 150 and written to the card reader/writer 26 for storage on the memory card 30 at a block 152. The process then ends.

The encryption algorithm is now described with reference to FIGS. 9 and 10. FIG. 9 illustrates a random video image data table prior to encryption, while FIG. 10 illustrates the resultant data table after encryption.

With reference initially to FIG. 9, the data table is represented by bytes consisting of two HEX characters. The byte number is illustrated in the bottom row and with the high characters shown above the low character for each byte number. Particularly, the byte number zero consists of the high character 2HEX and low character 1HEX.

The number of bytes in the image data table is dependent on the particular system requirements. The data table numbers only the first thirty-four bytes, as required for the encryption algorithm described herein below. Byte number zero is described as an AND byte, while bytes 1-16 are defined as offset table bytes. Bytes 17 on up are defined as data dispersement area bytes. Particularly, the AND byte number 0 is used to AND the high and low characters along with the offset table bytes to create an offset table. The offset table is then used to insert elements of verification data at select locations in the data distribution area.

Initially, the zero byte is converted to binary and the high four bits are shifted four positions and exclusive ORed with the low byte as in the following equation (1):

$$00000010B \text{ (XOR) } 00000001B = 00000011B$$

The exclusive ORed result in equation (1) is then ANDed with byte numbers 1-16 to create an offset table having sixteen offset values. Each offset value is identified with an index, or IDX, number 0-15. To insure a non-zero offset value, the binary number 1 is added to the result. For example, the offset value for IDX 2, related to byte number 3, is calculated using the following equation (2):

$$(1001\ 0010B \text{ AND } 0000\ 0011B) + 0000\ 0001B =$$
$$0000\ 0010 + 0000\ 0001 = 00000011B$$
$$= 3 \text{ Dec.}$$

The resultant offset table is as follows:

| OFFSET TABLE | |
|---|---|
| IDX # | OFFSET VALUE |
| 0 | 1 |
| 1 | 2 |
| 2 | 3 |
| 3 | 2 |
| 4 | 3 |
| 5 | 1 |
| 6 | 1 |
| 7 | 1 |
| 8 | 4 |
| 9 | 4 |
| 10 | 4 |
| 11 | 4 |

-continued

| OFFSET TABLE | |
|---|---|
| IDX # | OFFSET VALUE |
| 12 | 1 |
| 13 | 3 |
| 14 | 3 |
| 15 | 4 |

The offset table is used to determine the locations in the image table data disbursement area at which verification data is to be inserted. The verification data may be, for example, a terminal serial or identification number for the terminal 10 used to store the image data on the magnetic card 30. For example, a plurality of terminals 10 may be used, with each terminal having a distinct serial number. The serial number of the particular terminal 10 is encrypted with the image data so that, when later retrieved at a decoding device, the serial number can be removed and compared against a table of valid serial numbers to ensure authenticity. Alternatively, or additionally, an issue number of the particular memory card 30 may be encrypted. This identification number may be, for example, a user's account number or any other type of serial number which would also be stored in a master database for verification.

In the described example, four bytes (as shown in the following verification table) will be inserted in the image data table of FIG. 9:

| VERIFICATION TABLE | | | |
|---|---|---|---|
| C | C | C | C |
| 1 | 2 | 3 | 4 |

Figure 11:
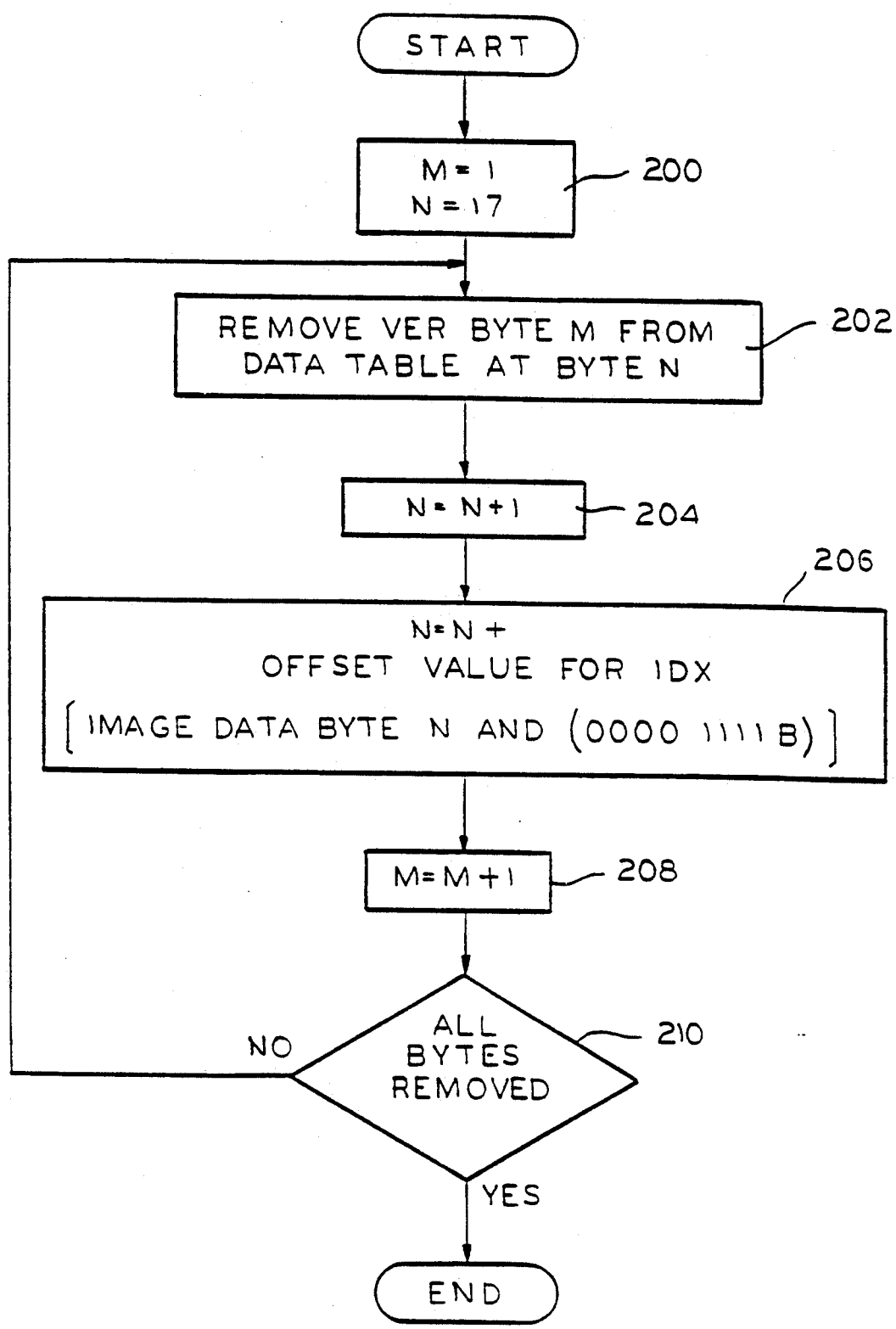
FIG. 11 is a flow chart illustrating operation of the program for performing encryption of verification data.

The verification data is inserted using steps illustrated in the flow diagram of FIG. 11. Encryption begins at a block 200, which sets a variable M equal to 1 and N equal to 17. The variable M relates to which verification byte is being inserted and the variable N is used to identify the position in the image data table at which the verification byte is to be inserted. N is set equal to 17 since the byte 17 is the first byte in the data displacement area. A block 202 inserts the verification byte M into the image data table at byte N. Particularly, the first verification byte C/1 is inserted at the seventeenth byte position in the data table. This is illustrated in the resultant data table of FIG. 10 as byte 17 having an asterisk thereunder. A block 204 increments the variable N by one. This prevents verification bytes from being inserted adjacent one another. A block 206 then adds an offset value to the variable N. The offset value is determined by calculating an IDX number by ANDing the image data for byte N with the binary character

00001111B

This drops the high character from the selected N byte number to insure an IDX number between zero and fifteen. For example, initially image data byte number eighteen, which is C/9, is ANDed to result in the value 0/9. The offset value for IDX 9 is four. Thus, the variable N is set equal to 18+4=22. A block 208 then increments the value M. A decision block 210 determines if all verification bytes have been inserted. If not, then control returns to the block 202, which inserts the next verification byte, in this case verification byte number 2, into the image data table at byte N, i.e., byte 22. This process continues until all verification bytes are inserted at distributed locations throughout the data dispersement area of the image data table. Particularly, the verification bytes are inserted at bytes 17, 22, 24 and 29, as shown by asterisks in FIG. 10.

By using the disclosed algorithm, which relies on the first seventeen bytes in the image data table, an encryption results which is different for each different data table to be stored on a memory card. Thus, it is not possible to create a counterfeit card by always inserting verification numbers at preselected locations. Instead, the locations are dependent on the actual data contained in the image data table, as described.

The encryption process described is used at the block 138 of FIG. 6 for recording an image table on a memory card 30. An opposite process is used at the block 122 of FIG. 5 for displaying the image from the data table. This is done in a reverse sequence which calculates the offset table, determines the positions at which verification information would have been inserted and then removes this verification information. The verification information can then be used for verifying authenticity while the data table with this information removed can be used to display the photographic or other likeness of the cardholder.

Thus, a fake-proof encoding system and method is described which prevents counterfeiting and results in a more secure system.

We claim:

1. A method of encoding fake proof video information data for storage on a user identification card including memory means for storing such data for later retrieval, comprising the steps of:
    acquiring personal video information for a user of an identification card;
    digitizing the acquired video information for storage in the card's memory means, said digitized video information comprising an information data table;
    generating unique digitized system verification information, said digitized verification information comprising a verification data table;
    combining said information data table with said verification data table, including inserting elements of data from said verification data table at select distributed locations in said information data table; and
    recording the combined information data table and verification data table into a memory means of a user identification card.

2. The method of claim 1 wherein said digitizing step further comprises the step of performing compression of the digitized video information stored in the information data table.

3. The method of claim 1 wherein said information data table comprises a table of N bytes of data and said comparing step includes the steps of creating an offset table using the first M bytes of data, where M<N, said offset table defining an offset value for each of a plurality of index numbers, selecting index values using information table data, and sequentially inserting bytes of data from the verification data table into the information data table at positions related to the offset values associated with the selected index values.

4. The method of claim 1 wherein said generating step comprises generating digitized system verification information identifying a unique serial number assigned to a terminal used to implement said method.

5. The method of claim 1 wherein said generating step comprises generating digitized system verification information identifying an issue serial number assigned to the user identification card.

6. A fake-proof system for recording verification information in a user identification card, the card including memory means for storing verification information stored thereon for later retrieval, comprising:
   means for acquiring personal identification information for a user of an identification card;
   means for electronically digitizing acquired information for storage in the card's memory means, said digitized acquired information comprising an information data table;
   means for generating unique digitized system verification information, said digitized verification information comprising a verification data table;
   means for combining said information data table with said verification data table, including means for inserting elements of data from said verification data table at select distributed locations in said information data table; and
   means operatively associated with said combining means for recording the combined information data table and verification data table into a memory means for a user identification card.

7. The system of claim 6 wherein said digitizing means further comprises means for performing compression of the digitized video information stored in the information data table.

8. The system of claim 6 wherein said information data table comprises a table of N bytes of data and said comparing means includes means for creating an offset table using the first M bytes of data, where M<N, said offset table defining an offset value for each of a plurality of index numbers, means for selecting index values using information table data, and means for sequentially inserting bytes of data from the verification data table into the information data table at positions related to the offset values associated with the selected index values.

9. The system of claim 6 wherein said generating means comprises means for generating digitized system verification information identifying a unique serial number assigned to a system terminal.

10. The system of claim 6 wherein said generating means comprises means for generating digitized system verification information identifying an issue serial number assigned to the use identification card.

11. A fake-proof system for recording video verification information in a user identification card, the card including memory means for storing verification information stored thereon for later retrieval, comprising:
    means for acquiring personal video identification information for a user of an identification card;
    means for electronically digitizing acquired video information for storage in the card's memory means, said digitized video information comprising an information data table;
    means for generating unique digitized system verification information, said digitized verification information comprising a verification data table;
    means for combining said information data table with said verification data table, including means for inserting elements of data from said verification data table at select distributed locations in said information data table; and
    means operatively associated with said combining means for recording the combined information data table and verification data table into a memory means for a user identification card.

12. The system of claim 11 wherein said digitizing means further comprises means for performing compression of the digitized video information stored in the information data table.

13. The system of claim 11 wherein said information data table comprises a table of N bytes of data and said comparing means includes means for creating an offset table using the first M bytes of data, where M<N, said offset table defining an offset value for each of a plurality of index numbers, means for selecting index values using information table data, and means for sequentially inserting bytes of data from the verification data table into the information data table at positions related to the offset values associated with the selected index values.

14. The system of claim 11 wherein said generating means comprises means for generating digitized system verification information identifying a unique serial number assigned to a system terminal.

15. The system of claim 11 wherein said generating means comprises means for generating digitized system verification information identifying an issue serial number assigned to the user identification card.

* * * * *